United States Patent
Zhang et al.

(10) Patent No.: US 11,998,989 B2
(45) Date of Patent: Jun. 4, 2024

(54) METHOD AND APPARATUS FOR MAGNETIC NANOPARTICLES DEVELOPMENT WITH ULTRA-SMALL SIZE, UNIFORMITY AND MONODISPERSITY

(71) Applicant: Trustees of Dartmouth College, Hanover, NH (US)

(72) Inventors: John X. J. Zhang, Hanover, NH (US); Nanjing Hao, Hanover, NH (US); Yuan Nie, Hanover, NH (US)

(73) Assignee: Trustees of Dartmouth College, Hanover, NH (US)

(*) Notice: Subject to any disclaimer, the term of this patent is extended or adjusted under 35 U.S.C. 154(b) by 134 days.

(21) Appl. No.: 17/602,409

(22) PCT Filed: Apr. 20, 2020

(86) PCT No.: PCT/US2020/028923
§ 371 (c)(1),
(2) Date: Oct. 8, 2021

(87) PCT Pub. No.: WO2020/219370
PCT Pub. Date: Oct. 29, 2020

(65) Prior Publication Data
US 2022/0203438 A1     Jun. 30, 2022

Related U.S. Application Data

(60) Provisional application No. 62/836,629, filed on Apr. 20, 2019.

(51) Int. Cl.
*B22F 9/24*     (2006.01)
*B01J 19/00*    (2006.01)
(Continued)

(52) U.S. Cl.
CPC ............. *B22F 9/24* (2013.01); *B01J 19/0093* (2013.01); *B22F 1/054* (2022.01); *B22F 1/0547* (2022.01);
(Continued)

(58) Field of Classification Search
None
See application file for complete search history.

(56) References Cited

U.S. PATENT DOCUMENTS

| 2005/0129580 | A1  | 6/2005 | Swinehart et al. |
| 2006/0014271 | A1* | 1/2006 | Song ............ B01J 19/0093 438/1 |

(Continued)

FOREIGN PATENT DOCUMENTS

WO     WO-2014006254 A1     1/2014

OTHER PUBLICATIONS

Abou Hassan, A. et al., "Synthesis of iron oxide nanoparticles in a microfluidic device: preliminary results in a coaxial flow millichannel", Chem. Commun., 2008, pp. 1783-1785, published as Advanced Article on the web Feb. 18, 2008.*

(Continued)

*Primary Examiner* — George Wyszomierski
(74) *Attorney, Agent, or Firm* — Shackelford, Bowen, McKinley & Norton, LLP

(57) ABSTRACT

In an embodiment, the present disclosure pertains to a method of making magnetic nanoparticles through the utilization of a microfluidic reactor. In some embodiments, the microfluidic reactor includes a first inlet, a second inlet, and an outlet. In some embodiments, the method includes applying a magnetic nanoparticle precursor solution into the first inlet of the microfluidic reactor through a first flow rate and applying a reducing agent into the second inlet of the microfluidic reactor through a second flow rate. In some
(Continued)

embodiments, the magnetic nanoparticles are produced in the microfluidic reactor and collected from the outlet of the microfluidic reactor. In an additional embodiment, the present disclosure pertains to a composition including a plurality of magnetic nanoparticles. In a further embodiment, the present disclosure pertains to a microfluidic reactor.

22 Claims, 6 Drawing Sheets

(51) Int. Cl.
| | | |
|---|---|---|
| *B22F 1/054* | (2022.01) | |
| *B22F 1/065* | (2022.01) | |
| *B22F 1/102* | (2022.01) | |
| *B22F 1/16* | (2022.01) | |
| *B22F 1/17* | (2022.01) | |
| *B22F 1/05* | (2022.01) | |
| *B82Y 40/00* | (2011.01) | |

(52) U.S. Cl.
CPC .............. *B22F 1/065* (2022.01); *B22F 1/102* (2022.01); *B22F 1/16* (2022.01); *B22F 1/17* (2022.01); *B01J 2219/00795* (2013.01); *B01J 2219/00891* (2013.01); *B22F 1/05* (2022.01); *B82Y 40/00* (2013.01)

(56) References Cited

U.S. PATENT DOCUMENTS

| | | | |
|---|---|---|---|
| 2009/0098027 A1* | 4/2009 | Tabata | B01J 19/0093 422/128 |
| 2009/0295005 A1* | 12/2009 | Rauscher | C30B 7/00 977/900 |
| 2011/0147641 A1 | 6/2011 | Meyer et al. | |
| 2013/0196084 A1* | 8/2013 | Decher | B05B 7/00 118/315 |
| 2015/0001437 A1* | 1/2015 | Carpenter | H01F 1/0063 252/62.51 R |
| 2016/0141630 A1* | 5/2016 | Zhou | H01M 4/926 429/523 |
| 2019/0118265 A1* | 4/2019 | Nie | A61K 47/6923 |
| 2019/0321895 A1 | 10/2019 | Santana et al. | |

OTHER PUBLICATIONS

The International Search Report and Written Opinion for PCT/US2020/028923, dated Aug. 27, 2020.

Hao, et al., Microfluidics-enabled rational design of immunomagnetic nanomaterial and its shape effect in liquid biopsy, Lab Chip, 2018, 18, 1997-2002.

Hao, et al., Microfluidic sythesis of functional inorganic micro-/nanoparticles and applications in biomedical engineering, International Materials Reviews, 63:8, 461-487.

* cited by examiner

METHOD AND APPARATUS FOR MAGNETIC NANOPARTICLES DEVELOPMENT WITH ULTRA-SMALL SIZE, UNIFORMITY AND MONODISPERSITY

CROSS-REFERENCE TO RELATED APPLICATIONS

This application claims priority to U.S. Provisional Patent Application No. 62/836,629, filed on Apr. 20, 2019. The entirety of the aforementioned application is incorporated herein by reference.

BACKGROUND

Current methods of making magnetic nanoparticles suffer from numerous limitations, including scalability, efficiency, continuity, and ease of use. Furthermore, current magnetic nanoparticles have limitations in terms of desired surface areas, size, uniformity, and dispersibility. Various embodiments of the present disclosure address the aforementioned limitations.

SUMMARY

In an embodiment, the present disclosure pertains to a method of making magnetic nanoparticles through the utilization of a microfluidic reactor. In some embodiments, the microfluidic reactor includes a first inlet, a second inlet, and an outlet. In some embodiments, the method includes applying a magnetic nanoparticle precursor solution into the first inlet of the microfluidic reactor through a first flow rate and applying a reducing agent into the second inlet of the microfluidic reactor through a second flow rate. In some embodiments, the magnetic nanoparticles are produced in the microfluidic reactor and collected from the outlet of the microfluidic reactor.

In an additional embodiment, the present disclosure pertains to a composition including a plurality of magnetic nanoparticles. In some embodiments, the magnetic nanoparticles have sizes of less than about 10 nm in diameter.

In a further embodiment, the present disclosure pertains to a microfluidic reactor. In some embodiments, the microfluidic reactor includes a first end having a first inlet and a second inlet, a second end having an outlet, and a channel between the first end and the second end. In some embodiments, the channel has a spiral shape. In some embodiments, the spiral shape includes a plurality of arcs.

DETAILED DESCRIPTION

It is to be understood that both the foregoing general description and the following detailed description are illustrative and explanatory, and are not restrictive of the subject matter, as claimed. In this application, the use of the singular includes the plural, the word "a" or "an" means "at least one", and the use of "or" means "and/or", unless specifically stated otherwise. Furthermore, the use of the term "including", as well as other forms, such as "includes" and "included", is not limiting. Also, terms such as "element" or "component" encompass both elements or components comprising one unit and elements or components that include more than one unit unless specifically stated otherwise.

The section headings used herein are for organizational purposes and are not to be construed as limiting the subject matter described. All documents, or portions of documents, cited in this application, including, but not limited to, patents, patent applications, articles, books, and treatises, are hereby expressly incorporated herein by reference in their entirety for any purpose. In the event that one or more of the incorporated literature and similar materials defines a term in a manner that contradicts the definition of that term in this application, this application controls.

Currently, the available methods for making magnetic nanoparticles suffer from several limitations. For example, these limitations can include, without limitation, scalability and efficiency issues, continuity issues, and overall ease of use.

Moreover, the methods currently available produce inferior magnetic nanoparticles. For instance, the magnetic nanoparticles produced by methods currently available have limitations in terms of their surface area, size, uniformity, and dispersibility. In addition, commercially available magnetic nanoparticles share similar shortcomings.

Accordingly, a need exists for more effective systems and methods for fabricating magnetic nanoparticles with desired surface areas, sizes, uniformity, and dispersibility. Various embodiments of the present disclosure address the aforementioned need.

Figure 1A:
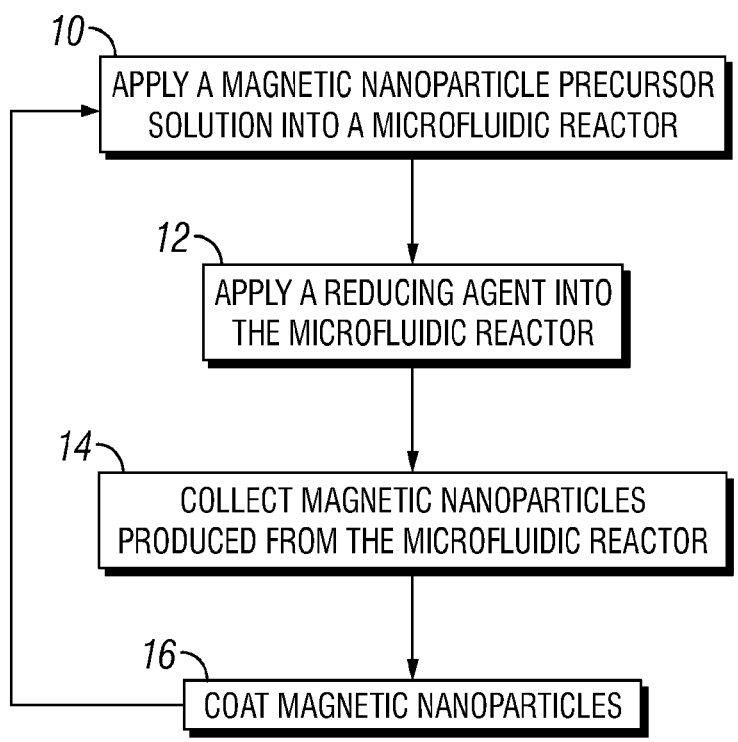
FIG. 1A illustrates a method of making magnetic nanoparticles through the utilization of a microfluidic reactor according to an aspect of the present disclosure.

In some embodiments, the present disclosure pertains to methods of making magnetic nanoparticles through the utilization of a microfluidic reactor. In some embodiments illustrated in FIG. 1A, the methods of the present disclosure generally include applying a magnetic nanoparticle precursor solution (step 10) and a reducing agent (step 12) into a microfluidic reactor. Thereafter, nanoparticles are produced in the microfluidic reactor and collected (step 14). In some embodiments, the magnetic nanoparticles can be coated (step 16) after collection. In some embodiments, the method can be repeated until a desired number of magnetic nanoparticles are produced and/or collected. In some embodiments of the present disclosure, the magnetic nanoparticles are not coated.

In some embodiments, the present disclosure pertains to magnetic nanoparticles with small sizes, high uniformity, monodispersity, high surfaces areas, and optimal saturation magnetization values. Additional embodiments of the present disclosure pertain to microfluidic reactors that can be utilized to produce the magnetic nanoparticles of the present disclosure.

Figure 1B:
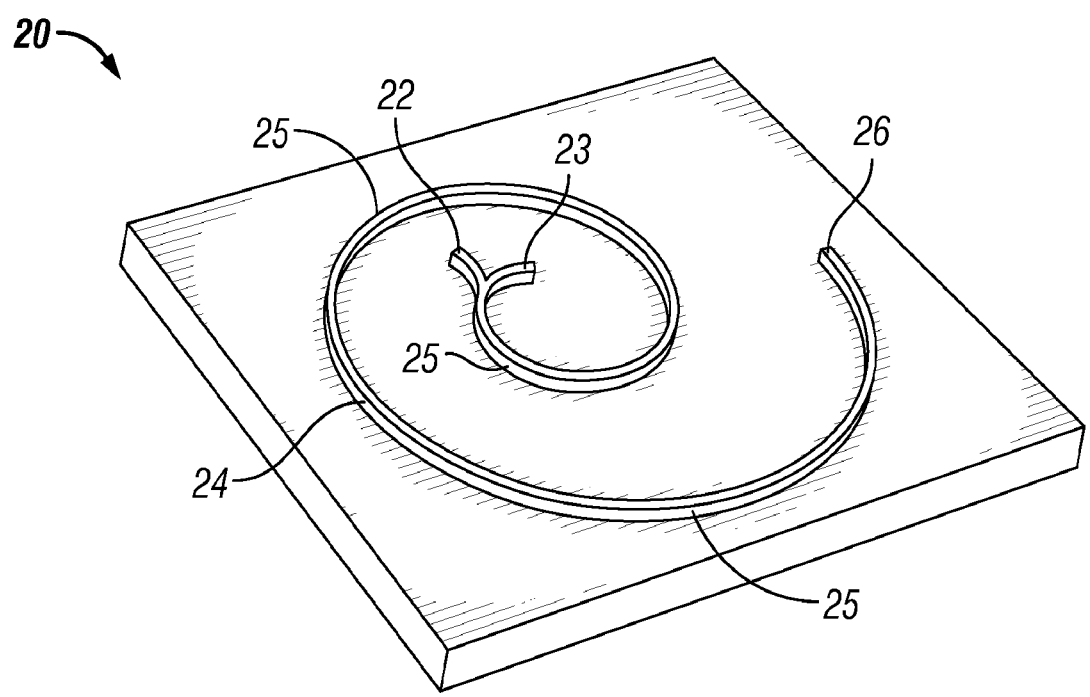
FIG. 1B provides an illustration of a microfluidic reactor for making magnetic nanoparticles according to an aspect of the present disclosure.

In some embodiments illustrated in FIG. 1B, the microfluidic reactors of the present disclosure can include microfluidic reactor 20. In this embodiments, microfluidic reactor 20 includes a first inlet 22, a second inlet 23, a spiral-shaped channel 24 with a plurality of arcs 25, and an outlet 26. In operation, a magnetic nanoparticle precursor solution and a reducing agent can applied into microfluidic reactor 20 through first inlet 22 and second inlet 23, respectively. Thereafter, nanoparticles are produced in channel 24 and collected from outlet 26.

As set forth in more detail herein, the methods, magnetic nanoparticles, and microfluidic reactors of the present disclosure can have numerous embodiments. For instance, the methods of the present disclosure can utilize various magnetic nanoparticle precursor solutions, reducing agents, and flow rates to form various types of magnetic nanoparticles with varying properties. Various microfluidic reactors may also be utilized to make the magnetic nanoparticles of the present disclosure.

Methods of Making Magnetic Nanoparticles

As set forth in more detail herein, the magnetic nanoparticles of the present disclosure can be made using various methods that generally include utilizing a microfluidic reactor. Furthermore, the magnetic nanoparticles of the present disclosure can be made with various magnetic nanoparticle precursor solutions and reducing agents utilizing various flow rates. For instance, in some embodiments, the methods of the present disclosure can utilize a microfluidic reactor that includes a first inlet, a second inlet, and an outlet. Generally, the methods of the present disclosure include the steps of: (1) applying a magnetic nanoparticle precursor solution into the first inlet of the microfluidic reactor through a first flow rate; and (2) applying a reducing agent into the second inlet of the microfluidic reactor through a second flow rate. Thereafter, the magnetic nanoparticles are produced in the microfluidic reactor and collected from the outlet of the microfluidic reactor. In some embodiments, the methods of the present disclosure can be utilized for the continuous fabrication of magnetic nanoparticles. In some embodiments, the magnetic nanoparticles can be coated after formation and/or collection. In some embodiments, the magnetic nanoparticles are not coated after formation and/or collection.

Moreover, the magnetic nanoparticles formed by the methods of the present disclosure may have various sizes, include various metals, and have various surface areas and saturation magnetization values. In addition, the magnetic nanoparticles may have various advantageous properties.

Magnetic Nanoparticle Precursor Solutions and Reducing Agents

The methods of the present disclosure can use various types of magnetic nanoparticle precursor solutions. For instance, in some embodiments, the magnetic nanoparticle precursor solution includes metal salts. In some embodiments, the metal salts include metal halides. In some embodiments, the metal halides include, without limitation, metal chlorides, metal fluorides, metal bromides, metal iodides, and combinations thereof.

In some embodiments, the metal salts include metal chlorides. In some embodiments, the metal chlorides include, without limitation, $FeCl_3$, $CoCl_2$, $NiCl_2$, and combinations thereof. In some embodiments, the metal salts include metal sulfate salts. In some embodiments, the metal sulfate salts include, without limitation, ferrous sulfate. In some embodiments, the metal salts include metal nitrate salts.

The methods of the present disclosure can also use various types of reducing agents. For instance, in some embodiments, the reducing agents include, without limitation, hydrazine, diborane, sodium borohydride, lithium aluminium hydride, potassium borohydride, ferrous sulfate, stannous chloride, oxalic acid, sodium hydroxide, hydrogen peroxide, hydrochloric acid, and combinations thereof.

Application Sequence

The methods of the present disclosure can also have various application sequences and flow rates. For instance, in some embodiments, the applying of the magnetic nanoparticle precursor solution and the reducing agent occur simultaneously. In some embodiments, the applying of the magnetic nanoparticle precursor solution occurs after the applying of the reducing agent. In some embodiments, the applying of the magnetic nanoparticle precursor solution occurs before the applying of the reducing agent.

Flow Rates

The magnetic nanoparticle precursor solutions and reducing agents of the present disclosure can be applied into microfluidic reactors through various flow rates (i.e., a first flow rate and a second flow rate, respectively). For instance, in some embodiments, the first flow rate and the second flow rate are the same. In some embodiments, the first flow rate and the second flow rate are different. In some embodiments, the first flow rate and the second flow rate provide laminar flow of the magnetic nanoparticle precursor solution and the reducing agent through the microfluidic reactor. In some embodiments, the first flow rate and the second flow rate provide mixing of the magnetic nanoparticle precursor solution and the reducing agent through the microfluidic reactor.

Production of Magnetic Nanoparticles

The methods of the present disclosure can form magnetic nanoparticles through various processes and under various conditions. For instance, in some embodiments, the magnetic nanoparticles are formed at room temperature. In some embodiments, the methods of the present disclosure occur without heating. In some embodiments, the methods of the present disclosure occur under ambient conditions.

In some embodiments, the magnetic nanoparticle production methods of the present disclosure occur under other types of conditions. For instance, in some embodiments, the methods of the present disclosure can occur under conditions including, but not limited to, heated conditions, cooled conditions, inert atmospheric conditions, vacuum conditions, and combinations thereof.

Coating of Magnetic Nanoparticles

In some embodiments, the formed magnetic nanoparticles of the present disclosure are coated with a coating agent. In some embodiments, the coating agent includes, without limitation, silica coatings, polymer coatings, titania coatings, metal coatings, and combinations thereof.

In some embodiments, the magnetic nanoparticles are coated with a silica coating, such as $SiO_2$. In some embodiments, the magnetic nanoparticles are coated with a polymer coating, such as poly(lactic-co-glycolic acid). In some embodiments, the magnetic nanoparticles are coated with a titania coating, such as $TiO_2$. In some embodiments, the magnetic nanoparticles are coated with a metal coating. In some embodiments, the metal coatings include, without limitation, gold coatings, silver coatings, platinum coatings, or combinations thereof. In some embodiments, the magnetic nanoparticles are not coated.

The magnetic nanoparticles of the present disclosure can be coated under various conditions. For instance, in some embodiments, the magnetic nanoparticles of the present disclosure can be coated under conditions that include, without limitation, ambient conditions, heated conditions, cooled conditions, inert atmospheric conditions, and combinations thereof.

The coating of the magnetic nanoparticles of the present disclosure can occur through various processes. For instance, in some embodiments, the coating occurs by spraying. In some embodiments, the coating occurs by sputtering.

Microfluidic Reactors

The methods of the present disclosure can utilize various types of microfluidic reactors. Additional embodiments of the present disclosure pertain to microfluidic reactors.

The microfluidic reactors of the present disclosure can have various structures. For instance, in some embodiments, the microfluidic reactors of the present disclosure have a structure that provides well-controlled laminar flow. In some embodiments, the microfluidic reactors of the present disclosure include a first end, a second end, and a channel between the first end and the second end. In some embodiments, the first inlet and the second inlet are positioned at the first end. In some embodiments, the outlet is positioned at the second end.

In some embodiments, the microfluidic reactors of the present disclosure can have more than two inlets. For instance, in some embodiments, the microfluidic reactors of the present disclosure have a first inlet, a second inlet and a third inlet. In some embodiments, the first inlet, the second inlet and the third inlet are positioned at the first end. In some embodiments the outlet is positioned at the second end.

The microfluidic reactors of the present disclosure can also have various alternative arrangements. For instance, in some embodiments, the first inlet and the second inlet are positioned at the second end. In some embodiments, the outlet is positioned at the first end.

In some embodiments, the channels of the microfluidic reactors of the present disclosure include a spiral shape. In some embodiments, the spiral shape includes one or more arcs. In some embodiments, the one or more arcs can have millimeter-scale diameters. For example, in some embodiments, the one or more arcs include three arcs with diameters ranging from about 5 mm to about 25 mm.

In some embodiments, the one or more arcs can have several central angles. For example, in some embodiments, the central angles can range from about 180° to 250°. In a particular embodiment, the one or more arcs can include three arcs with diameters of 7.69 mm, 13.8 mm, and 22.2 mm, and with the central angles of 180°, 180°, and 225°, respectively.

In some embodiments, the one or more arcs can include three arcs with diameters of 7.69 mm, 13.8 mm, and 22.2 mm, and with the central angles of 180°, 180°, and 180°, respectively. In some embodiments, the one or more arcs can include three arcs with dimeters of 7.69 mm, 13.8 mm, and 22.2 mm, and with the central angles of 180°, 180°, and 250°, respectively.

In some embodiments, the channels of the present disclosure are in the form of a microchannel. In some embodiments, the microchannel has widths ranging from about 50 μm to about 500 μm. In some embodiments, the microchannel has widths ranging from about 60 μm to about 400 μm. In some embodiments, the microchannel has widths ranging from about 70 μm to about 300 μm. In some embodiments, the microchannel has widths ranging from about 80 μm to about 200 μm. In some embodiments, the microchannel has widths ranging from about 90 μm to about 100 μm.

In a particular embodiment, the microchannel has a width of about 500 μm. In a particular embodiment, the microchannel has a width of about 400 μm. In a particular embodiment, the microchannel has a width of about 300 μm.

In some embodiments, the microchannel has heights ranging from about 50 μm to about 500 μm. In some embodiments, the microchannel has heights ranging from about 60 μm to about 400 μm. In some embodiments, the microchannel has heights ranging from about 70 μm to about 300 μm. In some embodiments, the microchannel has heights ranging from about 80 μm to about 200 μm. In some embodiments, the microchannel has heights ranging from about 90 μm to about 100 μm. In a particular embodiment, the microchannel has a height of about 500 μm.

In some embodiments, the microchannel has heights ranging from about 50 μm to about 200 μm. In some embodiments, the microchannel has heights ranging from about 50 μm to about 100 μm. In a particular embodiment, the microchannel has a height of about 100 μm.

The channels of the present disclosure can include various compositions. For instance, in some embodiments, the channels of the present disclosure include polymer-based channels. In some embodiments, the polymer-based channels include polydimethylsiloxane (PDMS)-based channels. In some embodiments, the polymer-based channels exclude polytetrafluoroethylene (PTFE)-based channels.

Various microfluidic reactors may be utilized to form the magnetic nanoparticles of the present disclosure. For instance, in some embodiments, the microfluidic reactors of the present disclosure include a continuous microfluidic reactor. In some embodiments, the continuous microfluidic reactor provides uninterrupted flow of the magnetic nanoparticle precursor solution and the reducing agent through the microfluidic reactor for the continuous production of magnetic nanoparticles. In some embodiments, the continuous microfluidic reactor does not utilize syringes.

In some embodiments, the continuous microfluidic reactor does not form droplets or immiscible phases within the microfluidic reactor. Rather, in some embodiments, the microfluidic reactor forms homogenous mixtures, homogenous solutions, and/or single-phase mixtures within the microfluidic reactor.

In some embodiments, microfluidic reactors other than droplet-based microfluidic reactors may be utilized to form the magnetic nanoparticles of the present disclosure. As such, in some embodiments, the microfluidic reactors of the present disclosure exclude droplet-based microfluidic reactors.

Formed Magnetic Nanoparticles

The methods of the present disclosure can form magnetic nanoparticles that include various metals, have varying sizes, and have various properties. Additional embodiments of the present disclosure pertain to the formed magnetic nanoparticles.

In some embodiments, the magnetic nanoparticles of the present disclosure can include various metals which can be in varying states. For example, in some embodiments, the metals are in a zero valent state. In some embodiments, the metals are in a multivalent state. In some embodiments, the metals include, without limitation, iron (Fe), cobalt (Co), nickel (Ni), silver (Ag), copper (Cu), gold (Au), platinum (Pt), palladium (Pd), germanium (Ge), and combinations thereof. In some embodiments, the metals include, without limitation, iron (Fe), cobalt (Co), nickel (Ni), and combinations thereof. In some embodiments, the metals include, without limitation, iron (Fe) and cobalt (Co).

The magnetic nanoparticles of the present disclosure can have various properties. For instance, in some embodiments, the magnetic nanoparticles of the present disclosure can have small sizes, high uniformity, monodispersity, and high surface areas. In some embodiments, the magnetic nanoparticles of the present disclosure are in a monodispersed form.

In some embodiments, the magnetic nanoparticles of the present disclosure have sizes of less than about 10 nm in diameter. In some embodiments, the magnetic nanoparticles have sizes of less than about 8 nm in diameter. In some embodiments, the magnetic nanoparticles have sizes of less than about 5 nm in diameter. In some embodiments, the magnetic nanoparticles have sizes in a range of about 1 nm to about 5 nm in diameter. In some embodiments, the magnetic nanoparticles have sizes of about 3 nm in diameter.

In some embodiments, the magnetic nanoparticles of the present disclosure have sizes of about 100 nm to 200 nm in diameter. In some embodiments, the magnetic nanoparticles of the present disclosure have sizes of about 2 μm to 3 μm in diameter. In some embodiments, magnetic nanoparticles have diameters less than about 5 μm.

In some embodiments, the magnetic nanoparticles of the present disclosure have sizes of about 0.5 nm to 500 nm in side length. In some embodiments, the magnetic nanoparticles of the present disclosure have sizes of about 0.5 nm to 5 nm in side length. In some embodiments, the magnetic nanoparticles of the present disclosure have sizes of about 5 nm to 10 nm in side length. In some embodiments, the magnetic nanoparticles have sizes of about 100 nm to 200 nm in side length. In some embodiments, the magnetic nanoparticles have lengths of less than 500 nm. In some embodiments, the magnetic nanoparticle have lengths of about 400 nm.

In some embodiments, the magnetic nanoparticles of the present disclosure may be in a composition. In some embodiments, at least 90% of the magnetic nanoparticles. In some embodiments, at least 95% of the magnetic nanoparticles have the same size. In some embodiments, at least 99% of the magnetic nanoparticles have the same size.

In some embodiments, the magnetic nanoparticles of the present disclosure have surface areas that range from about 100 $m^2/g$ to about 1,000 $m^2/g$. In some embodiments, the magnetic nanoparticles have surface areas that range from about 500 $m^2/g$ to about 1,000 $m^2/g$. In some embodiments, the magnetic nanoparticles have surface areas that range from about 750 $m^2/g$ to about 1,000 $m^2/g$.

In some embodiments, the magnetic nanoparticles of the present disclosure have saturation magnetization values ranging from about 1 emu/g to about 200 emu/g. In some embodiments, the magnetic nanoparticles of the present disclosure have saturation magnetization values ranging from about 1 emu/g to about 10 emu/g. In some embodiments, the magnetic nanoparticles of the present disclosure have saturation magnetization values ranging from about 10 emu/g to about 150 emu/g. In some embodiments, the magnetic nanoparticles have saturation magnetization values ranging from about 50 emu/g to about 150 emu/g. In some embodiments, the magnetic nanoparticles have saturation magnetization values ranging from about 100 emu/g to about 150 emu/g.

In some embodiments, the magnetic nanoparticles of the present disclosure can have various shapes. For example, the magnetic nanoparticles of the present disclosure can have shapes that include, without limitation, spherical shapes, short rod shapes, flower shapes, cubic shapes, and combinations thereof.

In some embodiments, the magnetic nanoparticles of the present disclosure can have various coatings. For instance, in some embodiments, the magnetic nanoparticles have a silica coating. In some embodiments, the coating has a thickness ranging from about 20 mm to about 50 nm. In some embodiments, the coating has a thickness of less than 100 mm.

Applications and Advantages

Figure 2:
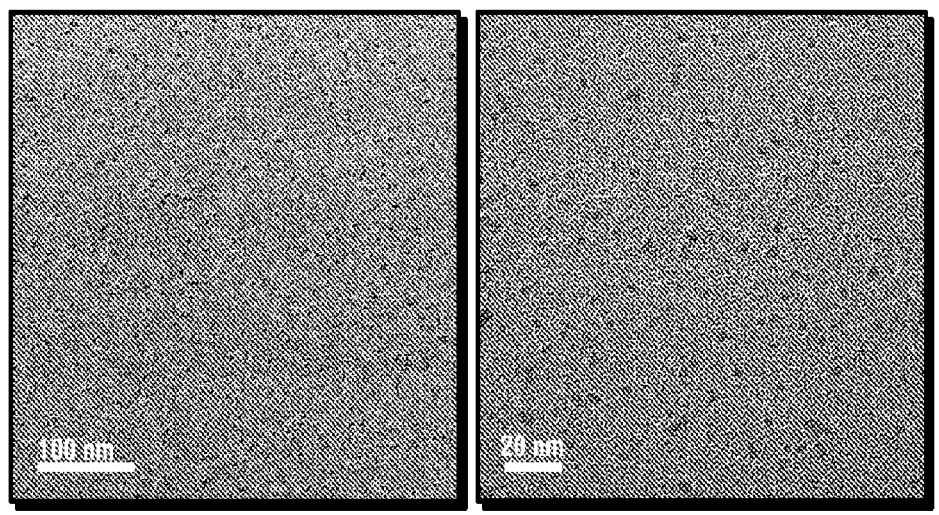
FIG. 2 provides transmission electron microscope (TEM) images of as-synthesized iron (Fe), cobalt (Co), and Nickel (Ni) magnetic nanoparticles.
Figure 2:
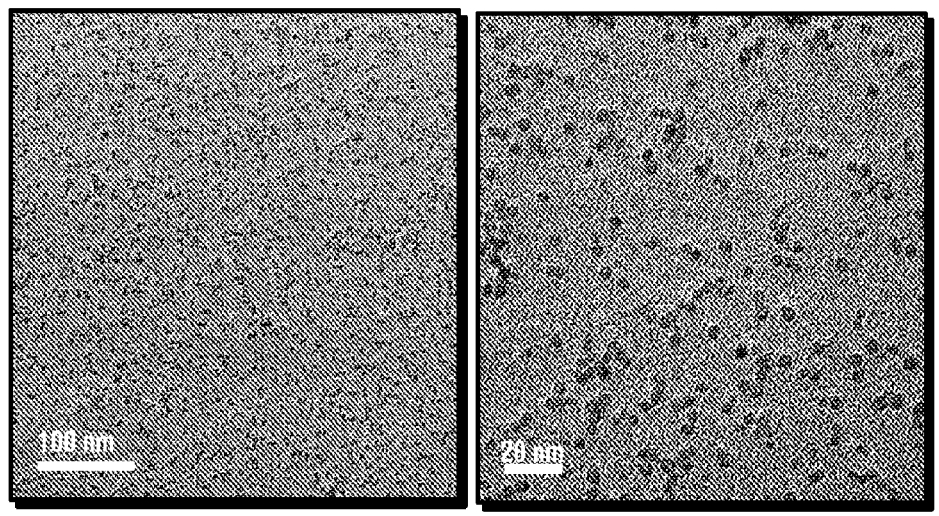
Figure 2:
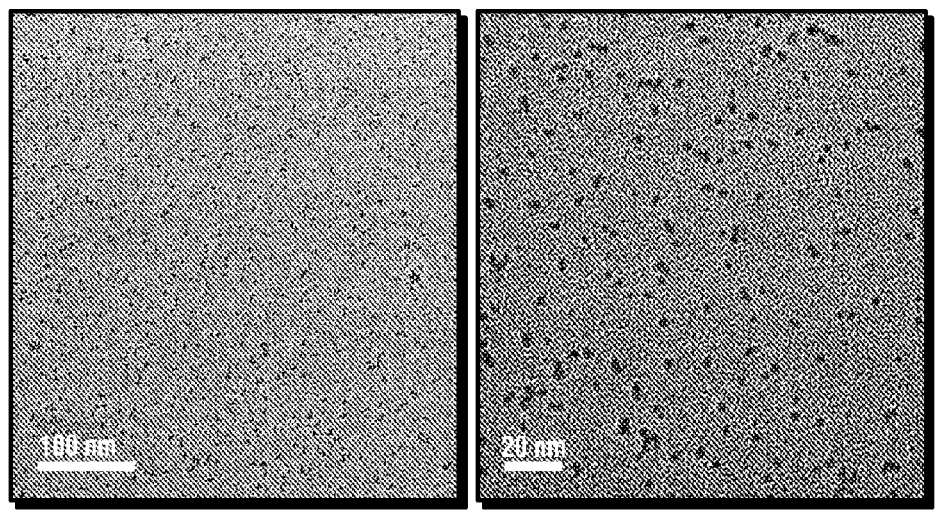

The methods and magnetic nanoparticles of the present disclosure can have various advantages. For instance, in some embodiments, the magnetic nanoparticles of the present disclosure provide optimal uniformity, monodispersity, ultra-small sizes (e.g., sizes of less than about 5 nm), and high surface areas. Such features are especially advantageous when compared to commercially available magnetic nanoparticles that generally have a wide size range and irregular structures. For instance, when compared to previous larger-sized magnetic nanoparticles (i.e., 10 nm and above, as shown in FIG. 2), such substantial reduction in particle size leads to a dramatic increase in particle surface area.

Moreover, the methods and microfluidic reactors of the present disclosure can be utilized to form the magnetic nanoparticles of the present disclosure in a facile, scalable, continuous, and efficient manner. For instance, in some embodiments, the methods of the present disclosure can be utilized to scale up the production of magnetic nanoparticles when a series of microfluidic reactors are integrated as an array. In fact, to the best of Applicants' knowledge, this approach was never reported before.

The methods and microfluidic reactors of the present disclosure can also provide scalable reaction systems with simple design rules. For instance, the methods and microfluidic reactors of the present disclosure can be utilized to form the magnetic nanoparticles of the present disclosure under ambient conditions, such as room temperature.

Moreover, the dimensions of the microfluidic reactors of the present disclosure are not limited by the diameter of channels, which may in turn affect the diameters of the nanoparticles obtained. Rather, in various embodiments, the dimensions of the channels of the present disclosure can be easily changed to meet the requirements of a reaction.

Additional Embodiments

Reference will now be made to more specific embodiments of the present disclosure and experimental results that provide support for such embodiments. However, Applicants note that the disclosure below is for illustrative purposes only and is not intended to limit the scope of the claimed subject matter in any way.

Example 1. Streamlined Microfluidic Reactor Based Strategy to Continuously Fabricate Magnetic Iron (Fe), Cobalt (Co), and Nickel (Ni) Nanoparticles with Ultra-Small Size In this Example, Applicants demonstrate the development of a streamlined microfluidic reactor based strategy to continuously fabricate magnetic iron (Fe), cobalt (Co), and nickel (Ni) nanoparticles with ultra-small size (~3 nm). Specifically, Applicants utilized a spiral-shaped microfluidic reactor (with a simple microchannel design) to fabricate magnetic Fe/Co/Ni nanoparticles.

In particular, the spiral-shaped microfluidic reactor with two inlets and one outlet that is illustrated in FIG. 1B was used. The microchannel shown in FIG. 1B is composed of several few arcs with millimeters-scale diameters (in this Example, the device parameters are three arcs with the diameters of 7.69, 13.8, and 22.2 mm, and with the central angles of 180°, 180°, and 225°, respectively). The width and the height of the spiral channel are micrometers-scale (in this Example, the device parameters are 500 and 50 μm, respectively).

Using readily available reactants, two inlets of the microfluidic reactor were utilized to produce magnetic nanoparticles at room temperature. One inlet contained precursor solutions (i.e., metal salts-$FeCl_3$/$CoCl_2$/$NiCl_2$) and the other inlet contained reducing agents (i.e., sodium borohydride). Corresponding Fe/Co/Ni magnetic nanoparticles were produced and collected at the outlet.

Due to the well-controlled laminar flows in microfluidics, magnetic nanoparticles produced in accordance with this Example have very good uniformity and monodispersity, especially when compared to commercially available magnetic nanoparticles that generally have a wide size range and irregular structures. The continuous synthesis strategy also allows for higher throughput and future scaling up of the production when a series of the microchannels are integrated as an array.

In summary, this Example demonstrates the development of a microfluidics-enabled synthesis approach of ultra-small-sized magnetic nanoparticles. The magnetic nanoparticles exhibit superior uniformity and monodispersity. Compared to previous larger-sized magnetic nanoparticles (i.e., 10 nm and above, as shown in FIG. 2), such substantial reduction in particle size leads to a dramatic increase in particle surface area. Moreover, the process described in this Example provides a general approach to fabricate magnetic zero valent Fe/Co/Ni nanoparticles.

Example 2. Magnetic Nanoparticles Development with Ultra-Small Size, Uniformity, and Monodispersity This Example aims to illustrate fabricated silica coated ferromagnetic nanoparticles. Here, two ferromagnetic nanoparticles are fabricated, namely, iron oxide ($Fe_3O_4$) nanoparticles and iron cobalt (FeCo) nanoparticles, for their relatively easy fabrication process and good ferromagnetic performance. The synthesis method for these two nanoparticles is different, but they are all batch-based methods and undergo the same silica coating process to produce the silica coated ferromagnetic nanoparticles, namely, $Fe_3O_4$@$SiO_2$ and FeCo@$SiO_2$ nanoparticles. For the $Fe_3O_4$@$SiO_2$, different particles shapes (e.g. sphere, short rod and flower) are achieved. For the FeCo@$SiO_2$ nanoparticles, a cubic shape is obtained.

Example 2.1. $Fe_3O_4$ Nanoparticle Synthesis

First, 0.17 ml HCl and 5 ml deionized (DI) water are combined and 1.73 g of $FeCl_3 \cdot 6H_2O$ and 0.63 g $FeCl_2 \cdot 4H_2O$ are dissolved in the solution under stirring. The solution is then added to 50 ml of 1.5 M NaOH solution under vigorous stirring followed instantly by black precipitates. Next, DI water is used to wash the solution with centrifugation at 4000 rpm for three times. Finally, 100 ml of 0.01 M HCl is added to the washed precipitates to neutralize the anionic charges on the nanoparticles.

Example 2.2. FeCo Nanoparticle Synthesis

The FeCo nanoparticles (nano cubes) are prepared using a modified liquid-phase reduction reaction. First, 20 ml of DI water is flushed with inert gas argon (Ar) for 20 mins. Then, 0.42 g ferrous sulfate ($FeSO_4 \cdot 7H_2O$), 0.098 g cobalt chloride ($CoCl_2$), 2.44 ml poly (ethylene glycol) (PEG) and 0.32 cyclohexane ($C_6H_{12}$) are dissolved in the oxygen-free DI water. This mixture is stirred magnetically under Ar gas for 20 mins and then heated up to 80° C. using a water bath. Next, a solution of diluted hydrazine (6.8 ml hydrazine and 1.7 ml DI water) and 0.99 g sodium hydroxide (NaOH) are added to the heated mixture. After 30 mins, a black feathery precipitate is obtained. After the temperature drops down to room temperature, the black precipitate was separated from the solution using a magnetic bar and washed with DI water and ethanol for 3 times each. The theoretical yield of the FeCo nanoparticles in this recipe is 0.086 g.

Example 2.3. Silica Coating Process

The basic silica coating process involves two steps. First, tetraethyl orthosilicate (TEOS) is added to the as-fabricated nanoparticles dropwise. Then, ammonium is added to the solution under vigorous shaking and they react for 1 hour. The amount of added reactant depends on the amount of nanoparticles being coated, the nanoparticles size and the desired coating thickness. For example, for 0.34 mg as-fabricated FeCo nanoparticles, the TEOS and ammonium amount are 0.92 ml and 0.04 ml, respectively, which yield an approximately 20-50 nm thick silica coating.

Example 2.4. Results

Table 1 and FIG. 3 summarize the as fabricated $Fe_3O_4$ and $Fe_3O_4$@$SiO_2$ nanoparticles. These nanoparticles have four different shapes, namely, cubic, spherical, short rod and flower with different sizes from several nanometers to several micrometers. Table 2 and FIG. 4 summarize the as-fabricated FeCo and FeCo@$SiO_2$ nanoparticles which are cubic or near-cubic shapes.

In addition, from the experiment, Applicants observed that the thickness of the silica coating can be tuned by the added amount of TEOS. The FeCo @ $SiO_2$ nanoparticles show a much stronger magnetic strength than that of the $Fe_3O_4$@ $SiO_2$ through a table-top, manual magnetic test using magnetic bars. However, the exact magnetic strength (emu/g) of these materials have not yet been measured directly using a scientific equipment.

TABLE 1

$Fe_3O_4$ and $Fe_3O_4$@$SiO_2$ Nanoparticles.

Figure 3A:
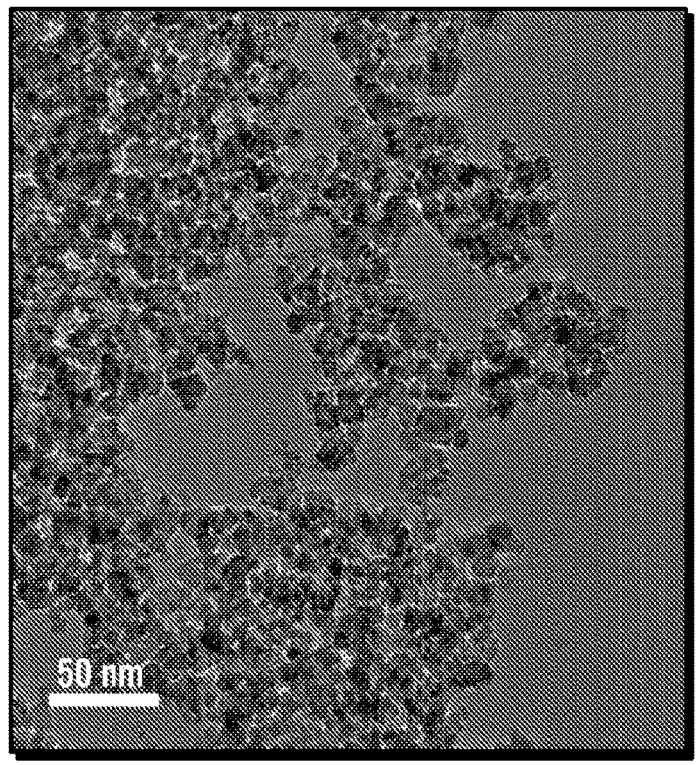
FIG. 3A, FIG. 3B, FIG. 3C, and FIG. 3D provide TEM images of as fabricated $Fe_3O_4$ and $Fe_3O_4$—$SiO_2$ nanoparticles.
Figure 3B:
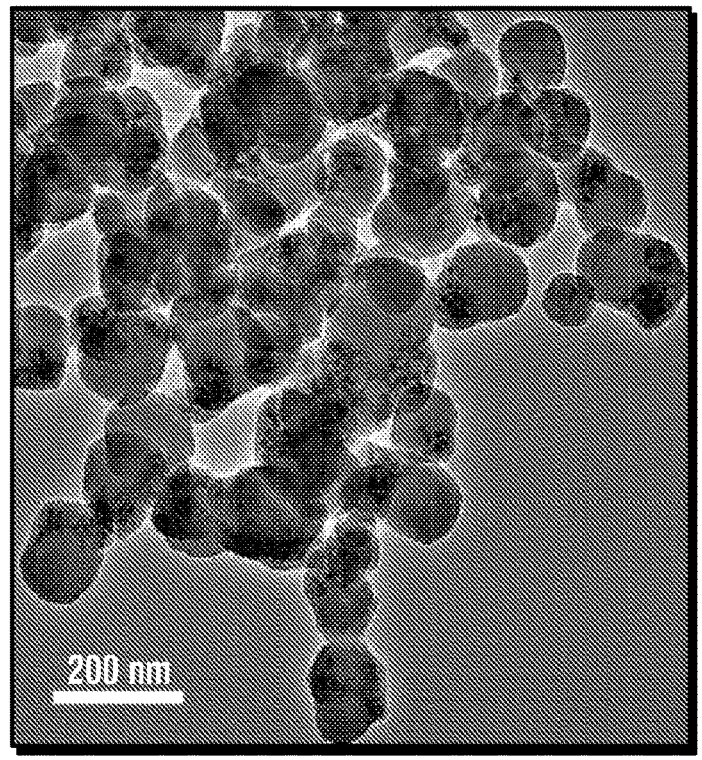
Figure 3C:
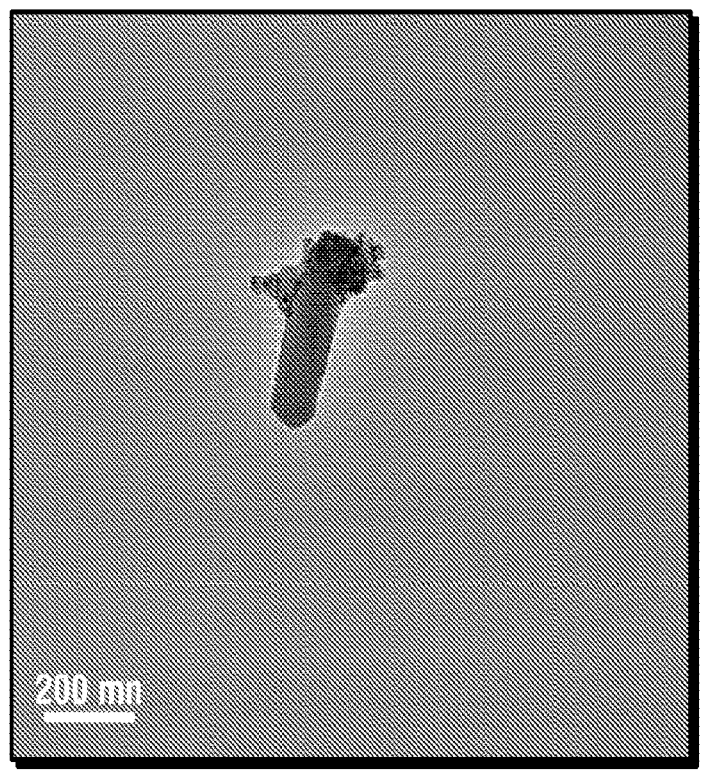
Figure 3D:
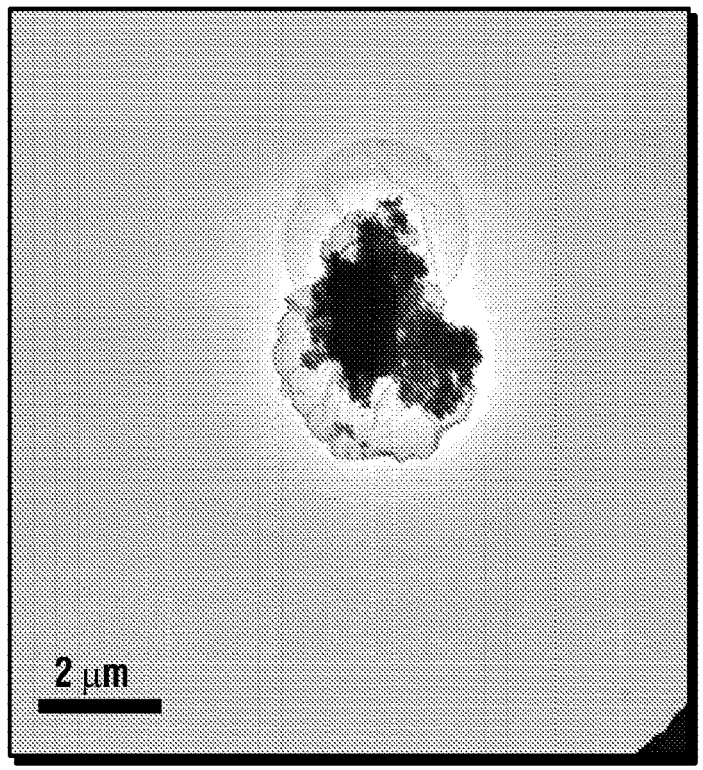

| | Sample 1 | Sample 2 | Sample 3 | Sample 4 |
|---|---|---|---|---|
| Figure Number | FIG. 3A | FIG. 3B | FIG. 3C | FIG. 3D |
| Description | $Fe_3O_4$ | | $Fe_3O_4$@$SiO_2$ | |
| Shape | Cubic | Sphere | Short rod | Flower |
| Size | ~5-10 nm (side length) | ~100-200 nm (diameter) | ~400 nm (length) | ~2-3 μm (diameter) |

TABLE 2

FeCo and FeCo@SiO2 Nanoparticles.

Figure 4A:
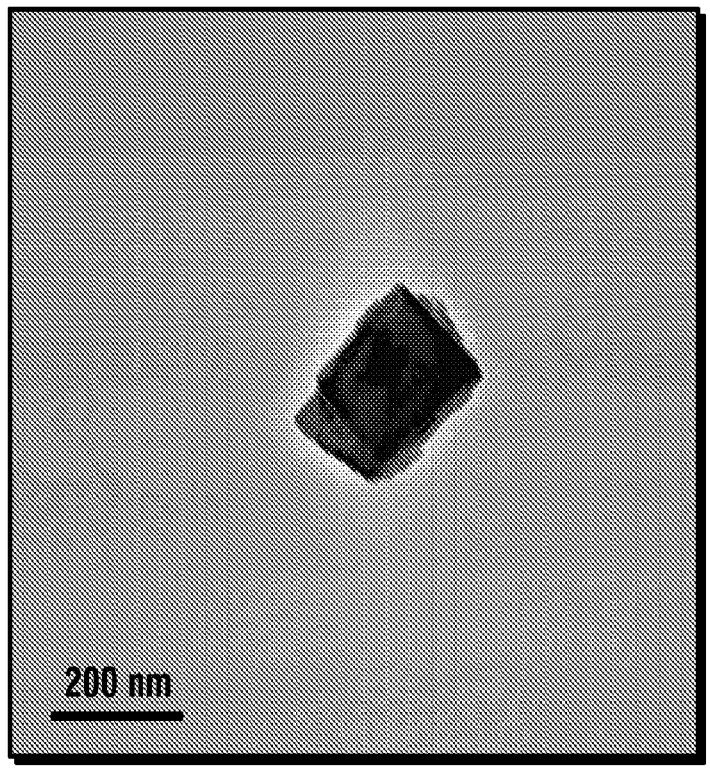
FIG. 4A and FIG. 4B provide TEM images of as fabricated FeCo and FeCo @$SiO_2$ nanoparticles.
Figure 4B:
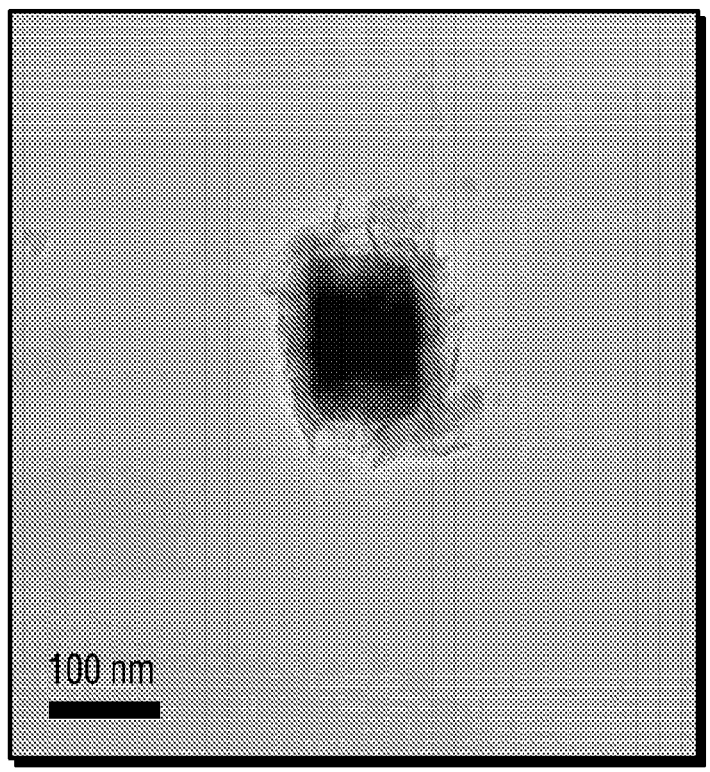

| | Sample 1 | Sample 2 |
|---|---|---|
| Figure Number | FIG. 4A | FIG. 4B |
| Description | FeCo | FeCo@$SiO_2$ |
| Shape | Cubic | |
| Size (Side Length) | ~100-200 nm | |
| Silica Shell Thickness | n/a | ~50 nm |

The synthesis of nanoparticles in the batch-based processes in this Example 2 rely on mixing of different reagents of certain concentrations at different stages of the process (i.e., nucleation and growth). Microfluidic-based processes described in Example 1 provide better mixing of reagents due to the increased surface-to-volume-ratio and fast heat and mass transfer at the microscale. In microreactors, addition of different reagents at different stages can also be precisely controlled. Therefore, not only will the batch-based processes in this Example 2 be applicable to the microfluidic-based processes of the present disclosure, but also the desired nanoparticles will be synthesized in a more controllable way.

Without further elaboration, it is believed that one skilled in the art can, using the description herein, utilize the present disclosure to its fullest extent. The embodiments described herein are to be construed as illustrative and not as constraining the remainder of the disclosure in any way whatsoever. While the embodiments have been shown and described, many variations and modifications thereof can be made by one skilled in the art without departing from the spirit and teachings of the invention. Accordingly, the scope of protection is not limited by the description set out above, but is only limited by the claims, including all equivalents of the subject matter of the claims. The disclosures of all patents, patent applications and publications cited herein are hereby incorporated herein by reference, to the extent that they provide procedural or other details consistent with and supplementary to those set forth herein.

What is claimed is:

1. A method of making magnetic nanoparticles through the utilization of a microfluidic reactor,
wherein the microfluidic reactor comprises:
a first end,
a second end,
a spiral shaped microchannel between the first end and the second end,
a first inlet and a second inlet, wherein the first inlet and the second inlet are positioned at the first end, and
an outlet positioned at the second end, and wherein the method comprises:
applying a magnetic nanoparticle precursor solution into the first inlet of the microfluidic reactor through a first flow rate; and
applying a reducing agent into the second inlet of the microfluidic reactor through a second flow rate,
wherein the first flow rate and the second flow rate provide laminar flow of the magnetic nanoparticle precursor solution and the reducing agent through the microfluidic reactor, and
wherein the magnetic nanoparticles are produced in the microfluidic reactor and collected from the outlet of the microfluidic reactor.

2. The method of claim 1, wherein the magnetic nanoparticle precursor solution comprises metal salts, wherein the metal salts are selected from the group consisting of metal chlorides, metal fluorides, metal bromides, metal iodides, and combinations thereof.

3. The method of claim 1, wherein the reducing agents are selected from the group consisting of hydrazine, diborane, sodium borohydride, lithium aluminium hydride, potassium borohydride, ferrous sulfate, stannous chloride, oxalic acid, sodium hydroxide, hydrogen peroxide, hydrochloric acid, and combinations thereof.

4. The method of claim 1, wherein the applying of the magnetic nanoparticle precursor solution and the reducing agent occur simultaneously.

5. The method of claim 1, wherein the applying of the magnetic nanoparticle precursor solution occurs after the applying of the reducing agent.

6. The method of claim 1, wherein the first flow rate and the second flow rate are the same.

7. The method of claim 1, wherein the first flow rate and the second flow rate are different.

8. The method of claim 1, wherein the microfluidic reactor is a continuous microfluidic reactor, wherein the continuous microfluidic reactor provides uninterrupted flow of the magnetic nanoparticle precursor solution and the reducing agent through the microfluidic reactor for the continuous production of magnetic nanoparticles.

9. The method of claim 8, wherein droplets or immiscible phases do not form within the microfluidic reactor.

10. The method of claim 1, wherein the magnetic nanoparticles are formed at room temperature, and wherein the method occurs without heating.

11. The method of claim 1, wherein the spiral shape of the microchannel comprises a plurality of arcs.

12. The method of claim 1, wherein the microchannel comprises widths ranging from 50 μm to 500 μm and heights ranging from 50 μm to 500 μm.

13. The method of claim 1, wherein the magnetic nanoparticles comprise metals, wherein the metals are selected from the group consisting of iron (Fe), cobalt (Co), nickel (Ni), silver (Ag), copper (Cu), gold (Au), platinum (Pt), palladium (Pd), germanium (Ge), and combinations thereof.

14. The method of claim 1, wherein the magnetic nanoparticles have sizes of less than about 10 nm in diameter.

15. The method of claim 1, wherein the magnetic nanoparticles comprise surface areas that range from about 100 $m^2/g$ to about 1,000 $m^2/g$.

16. The method of claim 1, wherein the magnetic nanoparticles comprise saturation magnetization values ranging from about 10 emu/g to about 150 emu/g.

17. The method of claim 1, wherein the magnetic nanoparticles have shapes selected from the group consisting of spherical shapes, rod shapes, flower shapes, cubic shapes, and combinations thereof.

18. The method of claim 1, further comprising coating the magnetic nanoparticles, wherein the magnetic nanoparticles are coated with a coating agent selected from the group consisting of silica coatings, polymer coatings, titania coatings, metal coatings, and combinations thereof.

19. A method of making magnetic nanoparticles through the utilization of a microfluidic reactor,
wherein the microfluidic reactor comprises:
a first end,
a second end,
a spiral shaped microchannel between the first end and the second end,
a first inlet and a second inlet, wherein the first inlet and the second inlet are positioned at the first end, and
an outlet positioned at the second end, and wherein the method comprises:
applying a magnetic nanoparticle precursor solution into the first inlet of the microfluidic reactor through a first flow rate; and
applying a reducing agent into the second inlet of the microfluidic reactor through a second flow rate,
wherein the applying of the magnetic nanoparticle precursor solution occurs after the applying of the reducing agent, and
wherein the magnetic nanoparticles are produced in the microfluidic reactor and collected from the outlet of the microfluidic reactor.

20. A method of making magnetic nanoparticles through the utilization of a microfluidic reactor,
wherein the microfluidic reactor comprises:
a first end,
a second end,
a spiral shaped microchannel between the first end and the second end,
wherein the microchannel comprises widths ranging from 50 μm to 500 μm and heights ranging from 50 μm to 500 μm,
a first inlet and a second inlet, wherein the first inlet and the second inlet are positioned at the first end, and
an outlet positioned at the second end, and wherein the method comprises:
applying a magnetic nanoparticle precursor solution into the first inlet of the microfluidic reactor through a first flow rate; and
applying a reducing agent into the second inlet of the microfluidic reactor through a second flow rate,
wherein the magnetic nanoparticles are produced in the microfluidic reactor and collected from the outlet of the microfluidic reactor.

21. A method of making magnetic nanoparticles through the utilization of a microfluidic reactor,
wherein the microfluidic reactor comprises:
a first end,
a second end,
a spiral shaped microchannel between the first end and the second end,
a first inlet and a second inlet, wherein the first inlet and the second inlet are positioned at the first end, and
an outlet positioned at the second end, and wherein the method comprises:
applying a magnetic nanoparticle precursor solution into the first inlet of the microfluidic reactor through a first flow rate; and
applying a reducing agent into the second inlet of the microfluidic reactor through a second flow rate,
wherein the magnetic nanoparticles are produced in the microfluidic reactor and collected from the outlet of the microfluidic reactor, and
wherein the magnetic nanoparticles have sizes of less than about 10 nm in diameter.

22. A method of making magnetic nanoparticles through the utilization of a microfluidic reactor,
wherein the microfluidic reactor comprises:
a first end,
a second end,
a spiral shaped microchannel between the first end and the second end,
a first inlet and a second inlet, wherein the first inlet and the second inlet are positioned at the first end, and
an outlet positioned at the second end, and wherein the method comprises:
applying a magnetic nanoparticle precursor solution into the first inlet of the microfluidic reactor through a first flow rate; and
applying a reducing agent into the second inlet of the microfluidic reactor through a second flow rate,
wherein the spiral shaped microchannel provides laminar flow of the magnetic nanoparticle precursor solution and the reducing agent through the microfluidic reactor, and
wherein the magnetic nanoparticles are produced in the microfluidic reactor and collected from the outlet of the microfluidic reactor.

* * * * *